UNITED STATES PATENT OFFICE.

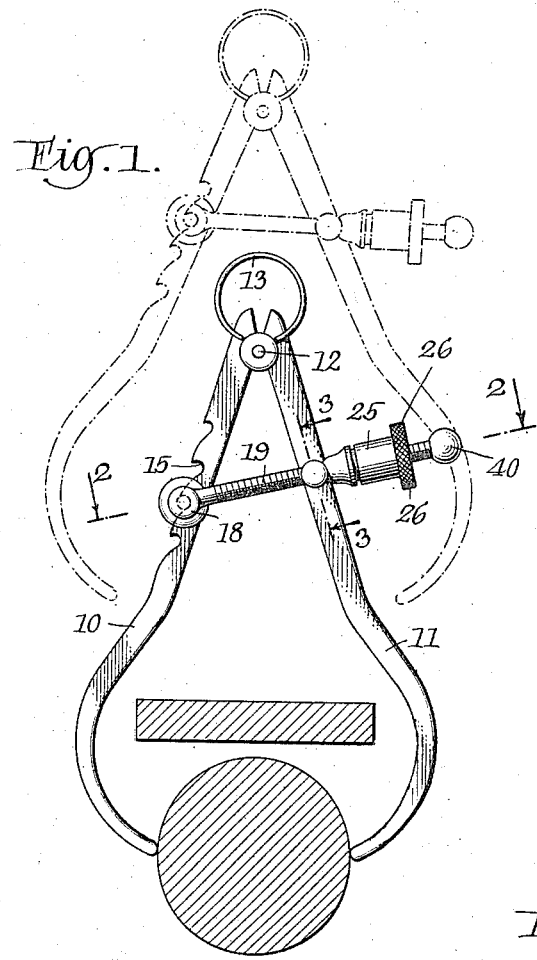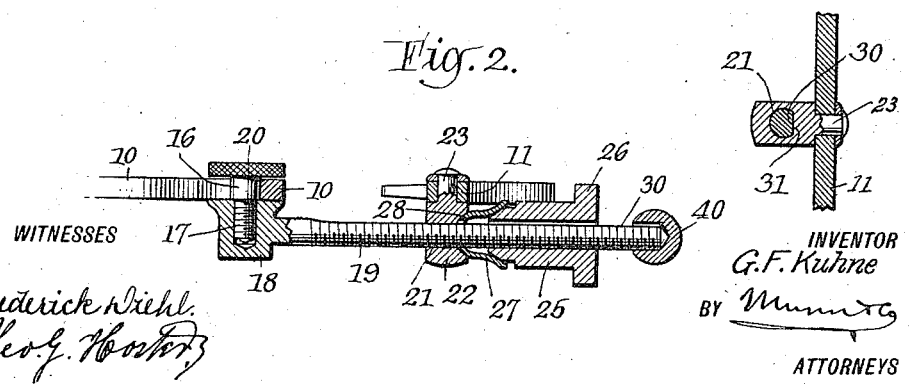

GEORGE FREDERICK KUHNE, OF EAST RUTHERFORD, NEW JERSEY.

CALIPERS OR SIMILAR MEASURING INSTRUMENT.

1,260,916.

Specification of Letters Patent.

Patented Mar. 26, 1918.

Application filed October 12, 1917. Serial No. 196,194.

*To all whom it may concern:*

Be it known that I, GEORGE FREDERICK KUHNE, a citizen of the United States, and a resident of East Rutherford, in the county of Bergen and State of New Jersey, have invented a new and Improved Calipers or Similar Measuring Instrument, of which the following is a full, clear, and exact description.

The object of the invention is to provide a new and improved inside or outside caliper, divider or similar measuring instrument arranged to permit the user to readily and accurately set the instrument to any desired degree of opening to allow of further opening of the instrument after it is set, with a view to pass it over an obstruction and to then accurately reset it to the original opening.

With this and other objects in view the invention consists essentially of arms hinged together, one of the arms being provided with a series of notches, a pivot on the other arm, a threaded link slidably engaging the said pivot and provided at one end with engaging means adapted to engage one of the said series of notches, and a nut screwing on the said link and abutting against the said pivot.

A practical embodiment of the invention is represented in the accompanying drawings forming a part of this specification, in which similar characters of reference indicate corresponding parts in all the views.

Figure 1 is a side elevation of the measuring instrument in the form of a caliper in calipering position on an object shown in section and in conjunction with an obstacle which requires further opening of the caliper for removal, as indicated in dotted lines;

Fig. 2 is an enlarged sectional plan view of the same on the line 2—2 of Fig. 1; and Fig. 3 is a cross section of the same on the line 3—3 of Fig. 1.

The arms 10 and 11 of the caliper shown in the drawings are connected with each other by a pivot 12 and are pressed on by a spring 13 in the usual manner. The arm 10 is provided on its outer edge with a series of notches 15 spaced varying distances from the center of the pivot 12, and any one of the said notches 15 is adapted to be engaged by a pin 16 having a threaded portion 17 screwed into the head 18 of a threaded link 19 extending across the arms 10 and 11. The head 18 of the link 19 overlies the upper face of the arm 10 and the head 20 of the pin 16 extends in close proximity to the under side of the said arm 10 thus preventing accidental displacement of the pin 16 in any one of the notches 15.

The link 19 extends through an opening 21 formed in the head 22 of a pivot 23 mounted to turn in the arm 11. The link 19 is screw threaded and on it screws a nut 25 provided at its outer end with a knurled head 26 to permit the user to conveniently turn the nut 25 on the screw threads of the link 19. The inner end of the nut 25 is provided with a conical centering and abutting member 27 adapted to engage a recess 28 formed in the head 22 of the pivot 23 to hold the nut in proper abutting position relative to the head 22 of the pivot 23. It is understood that when the pin 16 engages one of the notches 15 and the nut 25 is screwed up on the link 19 then the pressure exerted by the member 27 on the head 22 causes a closing of the arms 10 and 11 against the tension of the spring 13, and when the nut 25 is turned in the opposite direction and screws outward on the link 19 then the arms 10 and 11 open owing to the action of their spring 13.

In using the caliper the operator can readily close the arms 10 and 11 to approximately the size of the object to be calipered, and then the operator engages the pin 16 with the corresponding notch 15 and when the caliper is in position on the object the operator screws up the nut 25 so as to close the arms 10 and 11 until the object is properly calipered. Now in case an obstacle is in the path of the caliper, when removing the same from the object after the calipering is done, it is only necessary for the operator to disengage the pin 16 from the corresponding notch 15 and to swing the link 19 toward the pivot 12 to allow the arms 10 and 11 to open with a view to clear the obstruction, and when this has been done the operator closes the arms 10 and 11 and reëngages the pin 16 with the same notch 15 used at the time of calipering the object.

It is understood that by the arrangement described the caliper can be roughly set to the size of the object and then minutely adjusted to properly caliper the object.

In order to prevent the link 19 from accidentally turning, a portion 30 thereof is flattened and engages a flattened portion 31 of the wall of the opening 21 in the head 22, as will be readily understood by reference to Fig. 3. The outer end of the link 19 is preferably provided with a head 40 to prevent accidental unscrewing of the nut 25 from the link 19.

The instrument shown and described is very simple and durable in construction and enables the user to readily and accurately set the arms 10 and 11 to any desired degree of opening, and the arrangement also permits of opening the arms 10 and 11 after the caliper is set with a view to pass it over an obstruction and to then accurately reset it to the original opening.

Having thus described my invention, I claim as new and desire to secure by Letters Patent:—

1. In a caliper or similar measuring instrument, arms hinged together, one of the arms being provided with a series of notches, a pivot journaled on the other arm, and having a head, a threaded link slidably engaging the said head of the pivot and provided at one end with engaging means adapted to engage one of the said series of notches, and a nut screwing on the said link and abutting against the said head of the pivot.

2. In a caliper or similar measuring instrument, arms hinged together, one of the arms being provided with a series of notches, a pivot on the other arm, a threaded link slidably engaging the said pivot and provided at one end with engaging means adapted to engage one of the said series of notches, the said link having a flattened portion extending approximately throughout the length of the link and the said pivot having a flattened portion engaged by the flattened link portion to prevent the link from turning in the pivot, and a nut screwing on the said link and abutting against the said pivot.

3. In a caliper or similar measuring instrument, spring pressed arms connected with each other by a pivot, one of the arms being provided with a series of notches spaced varying distances from the said pivot, a pivot mounted to turn on the other arm and having an opening therethrough, a threaded link slidably passing through the said pivot opening, and terminating in a head overlying the upper face of the notched arm, a screw screwing in the said head and adapted to engage one of the said series of notches, the head of the screw engaging the under face of the said notched arm, and a nut screwing on the said link and having a centering and abutting member abutting against the said pivot.

GEORGE FREDERICK KUHNE.

Copies of this patent may be obtained for five cents each, by addressing the "Commissioner of Patents Washington, D. C."